United States Patent Office 2,735,756
Patented Feb. 21, 1956

2,735,756
PROCESS FOR PREPARING SOIL IMPROVEMENT MATERIALS

Eduard Farber, Washington, D. C., assignor to Timber Engineering Company, Washington, D. C., a corporation of Delaware No Drawing. Application June 16, 1953,
Serial No. 362,139

9 Claims. (Cl. 71—23)

This invention relates to soil improvement materials. More particularly, the invention relates to a method for enhancing the effectiveness of materials produced by heating lignocellulosic compositions with acids to a temperature above the boiling point of water but below the charring point of the compositions, as agents for improving characteristics of soils as seed germination and plant growing media.

In Farber Patent No. 2,574,027, issued November 6, 1951, there is described a process for producing a soil improvement material, which process embraces heating comminuted wood with a mineral acid to a temperature above the boiling point of water but below the charring point of the wood treated. The product so obtained has proved effective as an agent for improving soils in which seeds are to be germinated and plants are to be grown. It is the primary object of this invention to enhance the effectiveness of the products produced in the manner described in Patent No. 2,574,027 as soil improvement materials.

It is an additional object of the invention to provide a method for adding supplementary fertilizing or soil improving agents to the product described in Patent No. 2,574,027.

It is an additional object of the invention to provide an improved soil conditioning agent prepared by the treatment of comminuted wood with a mineral acid which is characterized by an optimum particle size range.

It is an additional object of the invention to provide an optimum mode and rate of application of the improved soil conditioning materials of the invention.

In accordance with this invention a soil improvement material of the type described in Patent No. 2,574,027, while at a temperature in excess of the boiling point of water (atmospheric pressure), is contacted with water, preferably a spray of an aqueous liquid, whereby steam is generated in the material and the effectiveness thereof in improving soil as seed germination and plant growing media is enhanced.

Reference is made to Patent No. 2,574,027 for a complete description of the method of producing the soil conditioning materials to which this invention relates. As disclosed in Patent No. 2,574,027, such soil improvement agents are prepared by heating comminuted lignocellulosic material, such as wood, with a mineral acid, in the absence of free water, to a temperature above the boiling point of water but below the decomposition or charring point of the comminuted wood treated. In general the temperatures employed in the preparation of the soil improvement materials range from about 130° C. to about 270° C.

In the preferred form of this invention the soil improvement material, prepared by the method described in Patent No. 2,574,027, is contacted with water, preferably in the form of a liquid spray, while at substantially the maximum temperature it attains in the course of manufacture, i. e., at a temperature within the range of about 130–270° C. It will be appreciated that in the practical embodiments of the invention the soil improvement materials may acquire an ultimate maximum temperature in excess of 270° C. and that all temperatures below the charring point of the wood or other lignocellulosic material treated, are contemplated. For example, temperatures in the order of 300° to 330° or 340° C. may in some circumstances be utilized in the preparation of the soil improving agents.

This invention is not restricted to the treatment of the soil improving agents while such agents are still hot in the manufacturing process. In the alternative, the soil improving agents may be prepared in a normal manner and allowed to cool and thereafter be reheated to temperatures in excess of the boiling point of water and contacted with water or an aqueous spray to generate steam in situ therein and to accomplish the objects of this invention.

In general, it may be stated that the amount of water or aqueous spray which is applied to the hot soil improvement materials in accordance with this invention can be calculated from the temperature at which the materials are contacted with the water or aqueous spray and from the heat capacity thereof. Preferably, the amount of water with which the hot soil improvement materials are contacted is so controlled that the final product subsequent to the water treatment will contain between about 10% and about 20% by weight of water. Such a moisture content facilitates handling of the product, minimizes dust formation, and facilitates wetting of the soil improving agents when placed in contact with soil.

It will be appreciated that, under the conditions requisite to the production of the soil improving agents prior to treatment in accordance with this invention, the water and materials of like volatile nature would be expected to be substantially entirely removed. The water treatment of this invention affords a practical means of establishing the preferred moisture content in the ultimate soil improvement product.

It will be appreciated that the incorporation into the soil improvement product of an optimum moisture content, while a beneficial consequence of the practice of this invention, is not the primary purpose thereof.

It may be desirable in the practice of this invention to utilize an aqueous spray containing in solution or suspension substances desired to augment or improve the soil improvement product. Among such substances may be included neutralizing agents for the acidic material employed in the formation of the soil conditioner. Such neutralizing agents include ammonium hydroxide, lime, and other organic and inorganic bases which are without adverse effect when applied to soils utilized for the germination of seeds and the growing of plants. Additionally, the quality of the ultimate soil conditioner product may be improved by incorporation therein, by means of the aqueous spray employed in the method of this invention, fertilizers such as urea and the like, trace elements, and other materials effective to improve the soil as a plant growing medium.

It has been determined that optimum results are obtained when there is utilized in the practice of this invention sawdust or other lignocellulosic material having a particle size of from about 5 to about 40 mesh. A similar result may be obtained by grinding and screening the product resulting from the treatment of particulate lignocellulosic material which is characterized by a particle size range falling outside the limits of 5–40 mesh.

The rate at which the soil conditioning agents with which this invention is concerned should be applied will vary with differing soils and climates. It has been determined that when the soil conditioning agents of the invention are initially employed in relatively high concentrations such as 20 tons per acre or more, the beneficial effect thereof will last through several growing seasons. When smaller rates of application are practiced, such as 2½ tons per acre or less, it is normally necessary to repeat the application after each season.

As indicated in Patent No. 2,574,027, all of the various mineral acids can be employed in the preparation of the soil conditioning agents to which this invention relates. Additionally, acidic materials such as sulfite waste liquors may be used either alone or in combination with conventional mineral acids. More specifically, hydrochloric acid, sulfuric acid, nitric acid, and various phosphoric acids, including particularly orthophosphoric acid, and the like, can be employed.

The following examples are illustrative of the practice of the invention. All parts are by weight unless otherwise indicated.

*Example I*

Comminuted wood containing 100 parts of dry wood substance and 30 parts of water are mixed with 8 parts of a solution containing two parts of sulfuric acid. The mixture is introduced into a rotary drum, in which the mixture is dried and then heated by means of direct contact with hot combustion gases. The relative rates at which products and hot gases move through the heating device or reactor are so regulated that near the outlet from the reactor the temperature of the material reaches 180–200° C. The reacted material leaves the reactor in a constant stream of hot particles. For each 100 parts of original wood substance, 75–80 parts of solid product leave the reactor. Twenty-five parts of water at room temperature are sprayed so that they mix with the hot product. The steam developed from this admixture is led through a dust collector into the atmosphere. The material retains about 10 parts of water as moisture.

*Example II*

To the water of Example I there is added hydrated lime in the amount corresponding to two parts per 100 parts of original wood.

*Example III*

The hot product is first subjected to a water spray of about 10 parts of water and then, as the material travels along, another 15 parts of water containing about 0.65 parts of ammonia per 100 parts of the original wood are mixed with the somewhat cool material and neutralized thereby.

*Example IV*

Three hundred parts by weight of maple wood sawdust are mixed with a solution of 30 parts of sodium acid sulfite dissolved in 150 grams of water. The thoroughly mixed and moistened materials are allowed to stand for about one hour so that the reagents can penetrate into the particles. A suspension of 20 parts of calcium oxide hydrate in 100 parts of water is added to the mixture thereby converting a part of the sodium salt into calcium sulfite. The mixture is dried and then heated to about 230° C. for about 10 minutes. The hot product so obtained is then sprayed with about 100 parts of water at room temperature. The steam which develops in situ in the product in vented to the atmosphere. The product so obtained retains about 20 parts of water as moisture.

*Example V*

One hundred parts of oak sawdust are air dried to a moisture content of 9%, mixed with 100 parts of a neutralized concentrated sulfite waste liquor corresponding to about 35 parts of lignin and other solids. The mixture is dried and then heated for 50 minutes at 200° C. The hot product, while substantially at a temperature of 300° C., is sprayed with about 35 parts by weight of water at room temperature containing minor amounts of trace elements. The steam which develops in situ in the product is vented to the atmosphere. The remaining soil conditioning material so produced contains about 15 parts by weight of water as moisture.

*Example VI*

One hundred parts of mixed walnut and oak sawdust, air dried, are mixed with 66 parts of waste sulfite liquor corresponding to 35 grams of lignin. Eleven parts of phosphoric acid dissolved in 80 parts of water are added and the mixture allowed to stand to effect penetration. The mixture is dried and then heated to 200° C. for 50 minutes. The product so obtained is treated with about 30 parts by weight of water containing about 5% by weight of urea in solution. The steam generated in the product by the treatment is vented to the atmosphere. An ultimate soil conditioner is obtained which is characterized by moisture content of about 15% by weight of water.

*Example VII*

The mixture of 50 parts of maple wood sawdust with 200 parts of waste sulfite liquor, 17 parts of phosphoric acid and 400 parts of water is air dried and then mixed with aqueous solution containing 10 parts of ammonia. At 230° C. little or no reaction occurs but when the mixture is heated to 270° C. for 5 minutes a substantial reaction occurs. The product so obtained is treated with an aqueous spray of 125 parts by weight of water at room temperature. The steam generated in situ in the product is vented to the atmosphere. The product so obtained is characterized by moisture content of about 10% by weight.

*Example VIII*

Ten parts of air dried oak wood sawdust are mixed in a ball mill with 5 parts of a dried commercial sulfite waste liquor lignin. The mixture is heated at 200° C. for 50 minutes. The product so obtained is sprayed while still at a temperature of about 200° C. with about three parts of water at room temperature. The soil conditioner thereby produced is characterized by a moisture content of about 12%.

*Example IX*

This example demonstrates the utility of the soil conditioning materials which are produced in accordance with the method of this invention. This example embodies the result of grass tests made with the soil conditioning agent produced in the manner described in Example I hereof. Two rates of addition of the soil improving materials and three variations of particle size were tested with respect to the germination and rate of growth of 1,000 Kentucky 31 Fescue grass seeds.

A control test with respect to 1,000 similar grass seeds planted in soil containing no soil conditioner was also completed.

Test procedure was as follows. Thirty-five glazed porcelain pots of about 8 inches in diameter and 12 inches in height were arranged in a single row. The hollow in the bottom of each of the pots was covered with a piece of one half inch wire mesh screen. About one quart of stones having an average diameter of about 1 inch was placed in the bottom of each of the pots for drainage. Sterilized sassafras clay mixed thoroughly with about 35% by weight of clean sand was added to the pots on top of the stones in an amount requisite to fill the pots to within about 2 inches of the top rim thereof. The soil improving agent, as prepared in Example I, and one teaspoon of a commercial 10–6–4 fertilizer were added to each pot and mixed by hand with the top 3 inches of the soil. Two hundred seeds of Kentucky 31 Fescue were planted in each of the pots and lightly covered with soil. One additional teaspon of 10–6–4 fertilizer was added to each of the pots after four, seven, and ten weeks of the test.

The rates of application of the soil improver and the variation in the particle size of the soil improver were as follows:

C—Control.

A2.5—Soil improver particles employed in size as produced and applied at the rate of 2.5 tons per acre.

A10—Same as A2.5 except application at the rate of 10 tons per acre.

A2.5 (10 m.)—Same as A2.5 except that only soil improver particles passing a 10 mesh screen were employed.

A10 (10 m.)—Same as A10 except that only particles of soil improver passing a 10 mesh screen were employed.

A2.5 (40 m.)—Same as A2.5 except that only soil improver particles passing a 40 mesh screen were employed.

A10 (40 m.)—Same as A10 except that only soil improver particles passing a 40 mesh screen were employed.

Five pots conforming to each of the above-identified test conditions were employed.

Germination in each of the pots was counted after the first two weeks.

The grass was clipped, dried in an oven and weighed after 36, 44, and 62 days of the test.

The results of the germination test are reported in Table I.

TABLE I

*Summary of germination test. Number of Seedlings obtained from 1000 seeds*

| Test | C | A2.5 | A10 | A2.5 (10 m.) | A10 (10 m.) | A2.5 (40 m.) | A10 (40 m.) |
|---|---|---|---|---|---|---|---|
| Seedlings | 527 | 576 | 568 | 587 | 560 | 587 | 573 |

It will be apparent from observation of the table that germination of the seeds in the soil treated with the soil improvement material of this invention is substantially greater than the germination of similar seeds in untreated soil.

The results of the grass clipping tests are reported in Table II.

TABLE II

*Summary of grass yields as grasses of oven-dry clippings 1, 2 and 3*

| Test | C | A2.5 | A10 | A2.5 (10 m.) | A10 (10 m.) | A2.5 (40 m.) | A10 (40 m.) |
|---|---|---|---|---|---|---|---|
| Clipping #1 | 5.9 | 8.5 | 8.9 | 8.5 | 8.4 | 7.7 | 7.9 |
| Clipping #2 | 12.60 | 14.22 | 14.82 | 16.45 | 15.15 | 14.61 | 13.67 |
| Clipping #3 | 17.86 | 18.87 | 21.56 | 22.62 | 22.10 | 21.02 | 21.64 |
| Total | 36.36 | 41.59 | 45.28 | 47.57 | 45.65 | 43.33 | 43.21 |

It will be observed from the data appearing in Table II that the yield of grass from the soils treated with the soil conditioning agents of this invention are substantially greater than the yields obtained from similar soils which have not been treated with the compositions of the invention.

I claim:

1. In a process including the steps of heating a particulate lignocellulosic material and a mineral acid at a temperature in excess of the boiling point of water but below the charring temperature of said material to produce a substantially dry soil improving agent, the improvement which comprises contacting said agent, at a temperature in excess of the boiling point of water, with an aqueous medium to generate steam in situ in said agent and enhance the effectiveness thereof for improving soils as seed germination and plant growing media.

2. The process of claim 1 wherein the soil improving agent is treated with the aqueous medium before the agent has cooled below the boiling point of water subsequent to its production.

3. The process of claim 2 wherein the aqueous medium is introduced in the form of an aqueous spray.

4. The process of claim 2 wherein the soil improving agent is treated with the aqueous medium while said agent is at a temperature from about 130° to about 270° C.

5. The process of claim 4 wherein the aqueous medium is introduced in the form of an aqueous spray.

6. The process of claim 2 wherein the aqueous medium is employed in amounts sufficient to produce an ultimate soil improving product containing from about 10% to about 20% by weight of water.

7. The process of claim 2 wherein the aqueous medium contains a neutralizing agent for the acids which may be present in the soil improving agent.

8. The process of claim 2 wherein the aqueous medium contains a fertilizer.

9. The process of claim 2 wherein the soil improving agent is characterized by a particle size of from about 5 to about 40 mesh.

References Cited in the file of this patent

UNITED STATES PATENTS

| Re. 22,295 | Olson | Mar. 30, 1943 |
| 1,261,328 | Wagner | Apr. 2, 1918 |
| 1,930,542 | Smith | Oct. 17, 1933 |
| 1,933,445 | Murdock | Oct. 31, 1933 |
| 2,541,058 | Heritage et al. | Feb. 13, 1951 |
| 2,574,027 | Farber | Nov. 6, 1951 |